Dec. 10, 1957   R. L. BAER   2,815,724
ICE CREAM SCOOP
Filed Nov. 12, 1954   2 Sheets-Sheet 1
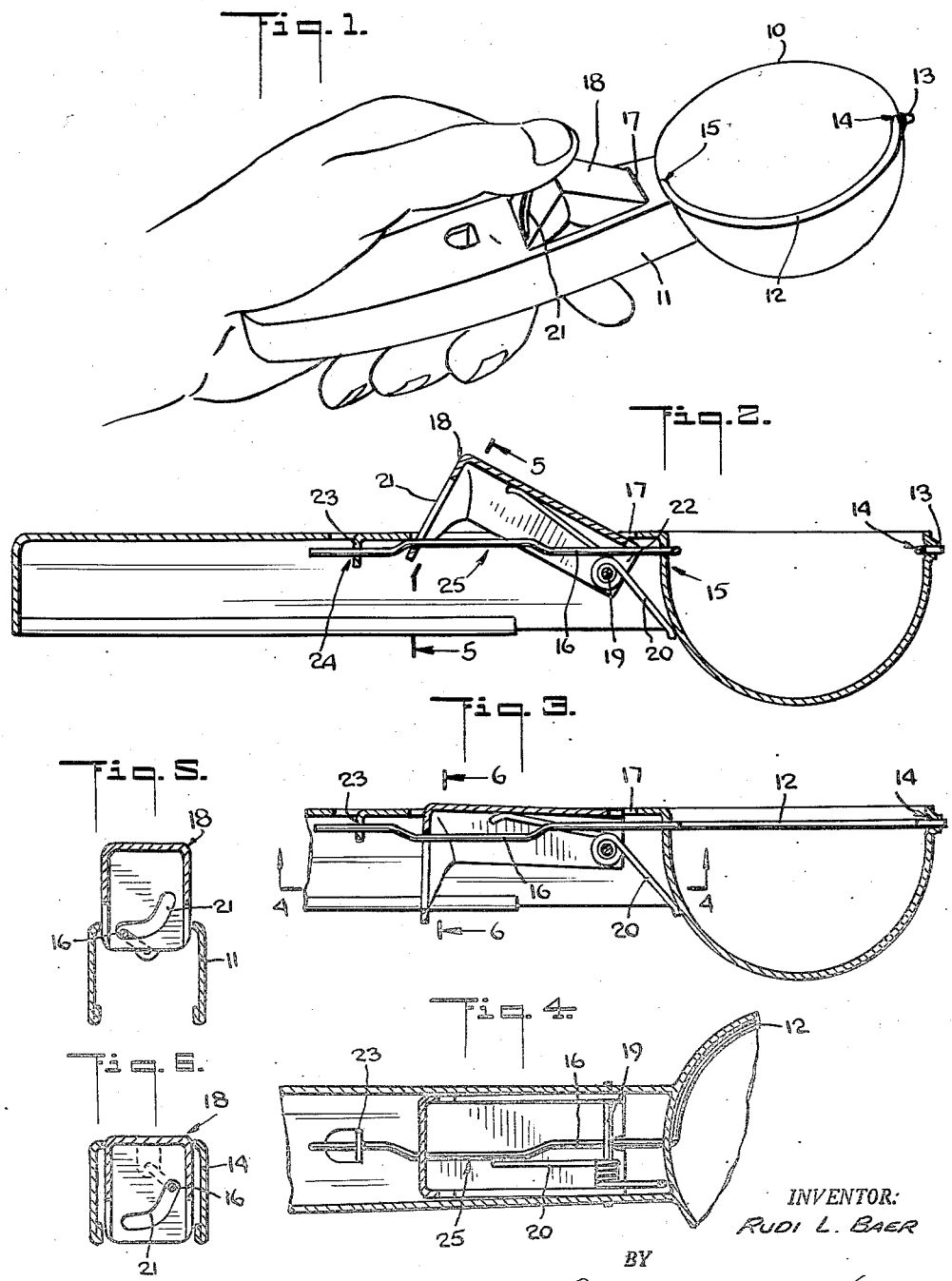
INVENTOR:
RUDI L. BAER
BY
Richardson, David and Nordon
ATTORNEYS Dec. 10, 1957
R. L. BAER
2,815,724
ICE CREAM SCOOP
Filed Nov. 12, 1954
2 Sheets-Sheet 2
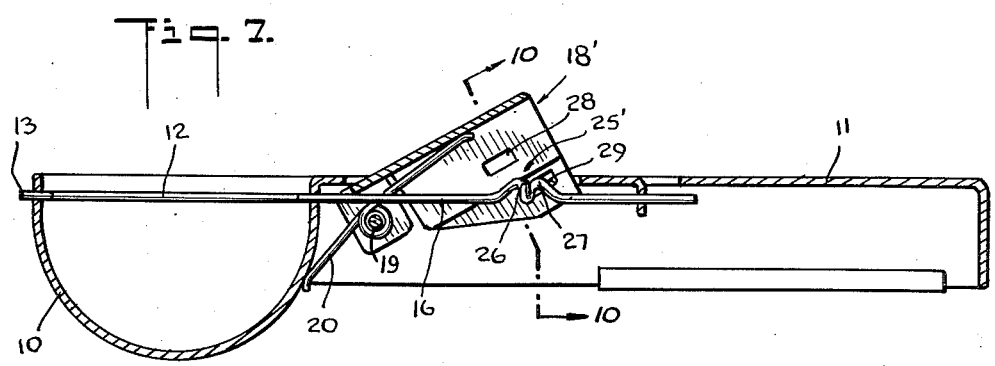
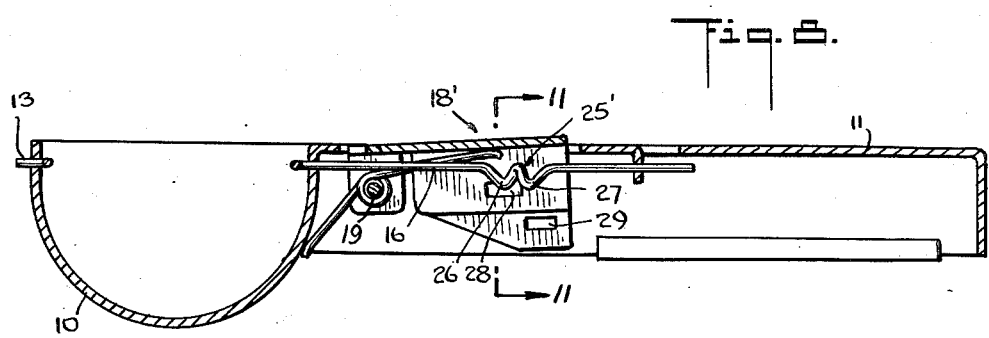
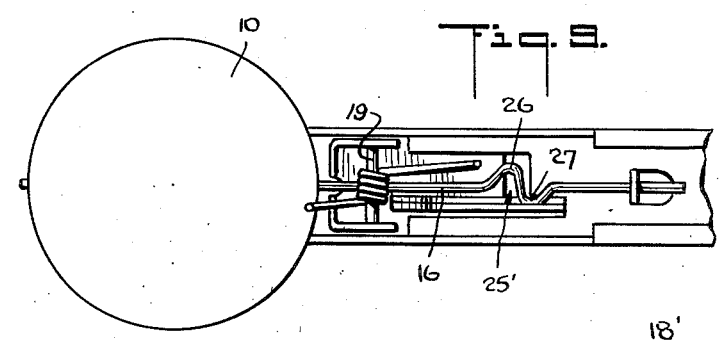
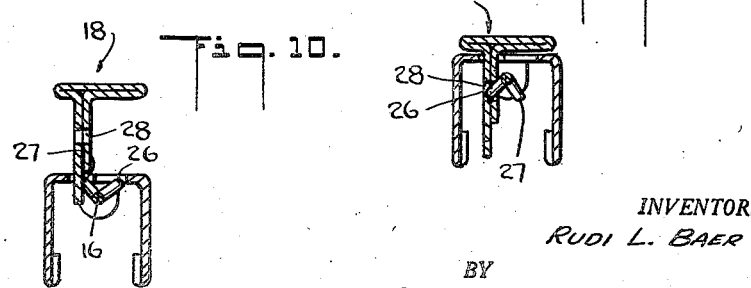
INVENTOR:
RUDI L. BAER
BY
Richardson, David and Nordon
ATTORNEYS.

United States Patent Office 2,815,724
Patented Dec. 10, 1957

2,815,724

ICE CREAM SCOOP

Rudi L. Baer, Roslyn Heights, N. Y.

Application November 12, 1954, Serial No. 468,466

9 Claims. (Cl. 107—48)

This invention relates to ice cream scoops and, in particular, to the type of scoop which is provided with an element for ejecting the ice cream.

Ice cream scoops of this general character are known; however, they are relatively expensive to manufacture, are cumbersome in construction, and difficult to keep clean. Moreover, many of these ice cream scoops have inefficient ejecting elements with the result that only a part of the ice cream held by the scoop is ejected. This is particularly undesirable when the scoops are used commercially in ice cream parlors, at soda fountains, etc. because the customer resents it when he does not receive the full amount of ice cream to which he considers himself entitled. Another defect in the old type construction is that the ice cream which normally should be ejected in hemispherical shape, drops from the scoop in lumpy, irregular form, which creates an unesthetic impression or, in other words, the opposite of what is desired in the wood industry. A further disadvantage of known constructions is that these devices generally comprise gears or the like which rapidly wear out, are subjected to breakage and are relatively costly from the point of view of assembly.

It is, therefore, an object of the present invention to provide an ice cream scoop that is efficient in operation and avoids the defects described above.

Another object of the invention is to provide an ice cream scoop which will neatly and quickly eject ice cream contained in the scoop.

A further object of the invention is to construct an ice cream scoop in such manner that the ejector element will automatically return to its rest position after ejection of the ice cream.

A still further object of the invention is an ice cream scoop which is actuated without the use of gears.

These and other objects will become more apparent from the following specification, claims, and the accompanying drawings in which—

Fig. 1 is a perspective view of an ice cream scoop according to the present invention;

Fig. 2 is a longitudinal sectional view of the ice cream scoop in rest position, as shown in Fig. 1;

Fig. 3 is a longitudinal sectional view of the ice cream scoop, with the ejector element in fully actuated position;

Fig. 4 is a sectional view along line 4—4 of Fig. 3;

Fig. 5 is a sectional view of line 5—5 of Fig. 2;

Fig. 6 is a sectional view along line 6—6 of Fig. 3;

Fig. 7 is a longitudinal sectional view of a modified form of construction, the ice cream scoop being shown in rest position;

Fig. 8, which is a view similar to that shown in Fig. 7, illustrates the ejector element in fully actuated position;

Fig. 9 is a bottom plan view of the modified construction according to Figs. 7 and 8;

Fig. 10 is a sectional view along line 10—10 of Fig. 7; and

Fig. 11 is a sectional view along line 11—11 of Fig. 8.

With particular reference to Fig. 1, it will be noted that the ice cream scoop, according to the present invention, comprises a hemispherical cup 10 which is secured to handle 11. The ejecting element consists of a rigid wire or similar element having a substantially semicircular portion 12 disposed near the mouth of cup element 10. The end 13 of the ejector element is bent radially outwardly and projects through aperture 14 as shown in Figs. 1, 2 and 3. The other end of ejector element 12 projects through opening 15 in cup element 10 and forms a prolonged actuating rod 16 which is concealed within the handle 11. The latter is substantially U-shaped as shown in Figs. 5 and 6, although any other suitable handle shape may be used and, in particular, the open bottom of handle 11 may be closed, if so desired. Handle 11 is provided in its top with a cutout 17 which is occupied by the actuating element 18. The latter is hingedly secured to handle 11 by means of pin 19 extending between the opposed side walls of the handle, which pin also supports spring element 20 which tends to maintain the actuating element 18 in its upwardly projecting rest position as shown in Figs. 1 and 2. Actuating element 18 may be of substantially triangular transverse section, as shown in the drawings, or of any other suitable shape. This actuating element 18 is provided with an arcuate slot 21 forming a cam surface. The forward end of actuating element 18 is open at 22 or, if it is formed as a closed unit, a suitable window is provided at this point. The actuating rod 16, which forms a prolongation of the semi-circular ice cream ejector 12, projects through openings 15, 22 and slot 21 and is supported near its free end by bracket element 23 which, if desired, may conveniently be stamped out of the top surface of handle 11 as shown in the drawings, although any other suitable bracket construction may be used for this purpose. Bracket 23 is provided with an opening 24 through which actuating rod 16 extends. Actuating rod 16 is provided with a substantially U-shaped portion 25 which permits the actuating rod to perform a crank action, controlled by the guiding slot 21.

The operation of the device according to Figs. 1 to 6 is as follows:

The hemispherical cup 10 is filled with ice cream which is generally accomplished by forcing the cup element into the bulk ice cream, so as to fill the cup. This may be done with the ejector element 12 either in rest position or in actuated position, in known manner. Actuating element 18 is conveniently manipulated by means of the operator's thumb, as illustrated in Fig. 1. When element 18 is depressed i. e., pivoted about pin 19, the cam surface formed by slot 21 turns the actuating rod 16 and as a result, the semi-circular ejector portion 12 of the ice cream scoop moves through 180 degrees along the inside surface of hemispherical cup 10, thus separating and detaching the ice cream which normally sticks to the inside of cup element 10.

The construction according to Figs. 7 to 11 is identical with that described above, except for the actuating rod and the actuating element therefor. For the sake of simplicity, corresponding elements have therefore been given the same reference numerals. According to the modification shown in Fig. 7, the actuating rod 16 is provided with twisted portion 25' instead of U-shaped portion 25 shown in Fig. 4 for instance. Twisted portion 25' comprises two adjacent arcuate projections or sections 26 and 27 which are adapted for engagement with apertures or slots 28 and 29, provided in actuating element 18'. The latter may consist of a single strip of metal bent so as to have a substantially T-shaped cross-section as shown in Figs. 10 and 11. Inasmuch as actuating element 18' is pivoted, apertures 28, 29 describe an arc when element 18' is actuated. For this reason, apertures 28 and 29 are arranged in staggered relation to each other for efficient engagement and disengagement with arcuate projections 26 and 27 of actuating rod 16. Thus, slots 28 and 29 are spaced angularly about pin 19 and are at different radial distances therefrom to cooperate with projections 26 and 27 which are correspondingly angularly spaced about rod 16 and longitudinally spaced therealong. The planes passing through projections 26 and 27 are preferably disposed at right angles to each other.

The operation of the modified device above described corresponds to that described in connection with Figs. 1 to 6. When actuating element 18' which is normally supported in raised position by spring 20, is depressed the projections 26, 27 of actuating rod 16 are successively engaged by apertures 29, 28 of actuating element 18'. As a result of this movement of actuating element 18', actuating rod 16 receives a rotary movement which causes the semi-circular ejector portion 12 to travel 180° through cup element 10, thereby ejecting any ice cream that may be in cup 10. When the downward pressure on actuating element 18' is released, it will return to the raised rest position shown in Fig. 7.

The ejector portion 12 has been shown in the form of a rod or wire of substantially circular cross-section and of generally semi-circular shape. It will be clear, however, that this element may have any other contour and any other desired cross-sectional shape. I am fully aware of the fact that various modifications may be made without departing from the scope and spirit of the present invention and I do not wish to be undestood as limiting myself to the structural details shown and described herein.

I claim:

1. An ice cream scoop comprising an open-topped cup-shaped scoop member, a hollow handle connected to said scoop member, said handle having a bottom, a pair of opposite side walls and a closed top provided with a cutout, an ejector element turnably mounted in said scoop member, an actuating rod connected to said ejector element and turnable therewith, said actuating rod extending into said hollow handle below said cutout and including a projecting control portion, actuating means hingedly connected to said handle for pivoting about a post extending between said side walls, said actuating means being provided with slot means in operative engagement with said control portion of said actuating rod, and spring means urging said actuating means upwardly out of said cutout.

2. The ice cream scoop claimed in claim 1, in which said control portion of said actuating rod is crank-shaped and said slot means is an arcuate slot.

3. The device claimed in claim 1, in which said actuating means consists of a substantially T-shaped lever, said slot means constituting slots being provided in the stem portion of the T-shaped lever, said slots being substantially parallel, spaced laterally and longitudinally with respect to each other; the top portion of said T-shaped lever providing a finger rest for the operator.

4. The device claimed in claim 3, in which said handle is substantially of U-shaped cross-section with the stem of said T-shaped lever projecting inside the U-shaped handle, said actuating rod being likewise disposed within and protected by the said handle, an opening being provided in the bottom wall of said handle adjacent the end of the handle leading to the mouth of the cup forming the scoop member, said T-shaped lever being disposed within the last mentioned opening and projecting therefrom, in rest position of the device, owing to the action of said spring means, the lattter being likewise disposed within and concealed by the said handle.

5. The ice cream scoop claimed in claim 1, in which said actuating rod is of substantially straight form and is interrupted by said control portion which consists of a substantially helical twist in said straight actuating rod, the projections formed by said helix cooperating with the slot means of the actuating means.

6. The ice cream scoop claimed in claim 5, in which two projections are provided by said helical twist in the slot rod, and in which said actuating means constitutes two slots.

7. The ice cream scoop claimed in claim 6, in which said slots are spaced laterally and longitudinally with respect to each other.

8. An ice cream scoop comprising a substantially hemispherical cup provided with first and second diametrically opposed apertures, a downwardly open hollow handle aligned with said first and second apertures and connected to said cup, said handle being provided in its top with a cutout and with a downwardly struck tongue having a third aperture therein, said third aperture being aligned with said first and second apertures, a semicircular ejector element extending between said first and second apertures, an actuating rod operatively connected with said ejector element adjacent said second aperture and extending to said third aperture, said rod being provided with a plurality of helical twist portions projecting radially therebeyond at angularly spaced intervals, a T-shaped lever pivoted to said handle, the top portion of said T-shaped lever constituting a finger rest and the stem portion of said lever extending into said cutout of said handle, said stem portion being provided with a plurality of slots spaced laterally and longitudinally from each other, each of said slots being disposed for cooperation with a respective one of said helical twist portions, and spring means urging said lever out of said cutout, whereby upon manipulating said cross-piece of said T-shaped lever against the action of said spring means, said lever is pivoted about its pivot to thereby successively engage said slots with said helical twist portions of said actuating rod thereby rotating the latter and causing said ejector element to rotate within said cup.

9. An ice cream scoop as defined in claim 8, two helical twist portions being provided and offset about the axis of said actuating rod by an angle of about 90°.

References Cited in the file of this patent

UNITED STATES PATENTS

| 538,693 | Noyes | May 7, 1895 |
| 1,049,585 | Honecker | Jan. 7, 1913 |
| 1,956,224 | Myers | Apr. 24, 1934 |
| 2,013,265 | Chester | Sept. 3, 1935 |
| 2,633,814 | Chester | Apr. 7, 1953 |